(12) United States Patent
Hom

(10) Patent No.: US 7,174,003 B2
(45) Date of Patent: Feb. 6, 2007

(54) METHOD AND SYSTEM FOR TROUBLESHOOTING A SECURITY SYSTEM'S TELEPHONE LINES

(75) Inventor: Wayne C. Hom, Rancho Santa Margarita, CA (US)

(73) Assignee: The Chamberlain Group, Inc., Elmhurst, IL (US)

( * ) Notice: Subject to any disclaimer, the term of this patent is extended or adjusted under 35 U.S.C. 154(b) by 127 days.

(21) Appl. No.: 10/170,042

(22) Filed: Jun. 11, 2002

(65) Prior Publication Data

US 2003/0228000 A1   Dec. 11, 2003

(51) Int. Cl.
*H04M 3/08*   (2006.01)
*H04M 9/00*   (2006.01)
*H04M 11/00*  (2006.01)

(52) U.S. Cl. .............................. 379/29.01; 379/167.01; 379/102.06

(58) Field of Classification Search ............. 379/27.01, 379/27.02, 29.01, 167.01, 167.07, 167.11, 379/32.01, 33, 37, 39, 102.01, 102.02, 102.06, 379/22.01
See application file for complete search history.

(56) References Cited

U.S. PATENT DOCUMENTS

| 4,937,855 A | * | 6/1990 | McNab et al. | ......... 379/102.06 |
| 5,901,201 A | * | 5/1999 | Schull | ..................... 379/22.03 |
| 6,078,646 A | * | 6/2000 | McLaughlin et al. | .... 379/27.01 |

* cited by examiner

*Primary Examiner*—Barry Taylor
(74) *Attorney, Agent, or Firm*—Fitch, Even, Tabin, & Flannery

(57) ABSTRACT

A system and method of troubleshooting a communication connection for a remotely located security system is disclosed. A communication line test unit is incorporated into the remote security system and its communication unit. A central control unit can then contact the remote security system communication unit, enable the communication line test unit and perform tests on various operational parameters of the communication unit located in the remote unit and the communication connection of the local unit. The tests conducted can include loop current, tip to ring voltage, ring to ground current, circuit loss, circuit noise, power influence as well as other tests. Based on the results of these tests a determination can be made if the problem is an extraneous influence, such as a poor local telephone line connection, or some problem with the security system communication unit itself.

12 Claims, 3 Drawing Sheets

METHOD AND SYSTEM FOR TROUBLESHOOTING A SECURITY SYSTEM'S TELEPHONE LINES

FIELD OF THE INVENTION

The invention relates to security systems that use telephone lines to communicate with remote units. More particularly it relates to a system and method for testing the operational characteristics of the telephone lines used to communicate with a remotely located security unit.

BACKGROUND OF THE INVENTION

Systems for access control often consist of a centralized unit that monitors and controls the operation of a number of remote units. The systems are commonly used with gated communities, restricted access apartment complexes, office complexes, research facilities, or in other situations where there is a need or desire to create a restricted access area. These systems are also often installed and used with single-family residences. The remote units generally control accesses to the restricted or secure area and require an individual seeking entry into the secure area to interact with the remote unit located at a gate or entry barrier by inputting an appropriate code into the local security unit or to call on a telephone or similar system located at the local security unit a person at a location within the restricted area with authority and means to allow the individual seeking access to enter.

Use of standard telephone lines offers one of the most economical and efficient ways of connecting remote security units with a central control unit. It only involves the connecting of a standard telephone line to the remote unit. Communication between the computer system of the remote unit and the central unit is then handled by standard modems connected to the computer systems of the central unit and the remote unit. However, as with any system as complicated and intricate as a remotely operated security system, problems arise during operation with the system including the break down of the communication link between the central control unit and the remote unit. When these episodes occur and prove intractable, the manufacturer or distributor of the systems has to dispatch a trained technician to service the remote unit. Sometimes it may entail the replacement of hardware that has malfunctioned on the remote system. However, the telephone line itself can be the primary cause of the communication problem between the remote security unit and central control unit.

More often than not, the problem in maintaining a satisfactory communication link between the customers control center and the customers remote security unit is due to inadequate telephone line quality of the local telephone company's telephone lines. Modem to modem communications between computers requires a higher standard of telephone line quality then voice communication. Excessive noise or other interference on a telephone line may only be a background annoyance when someone is speaking on a telephone but for modem to modem communications between computers it can significantly degrade communication performance and often result in the termination of communication. Typically, when excessive noise or static occurs on a telephone line, in order to continue communications the modems will drop the baud rate they are operating at. If the interference becomes too sever, the modems will stop communication. To further complicate this problem, the quality of the telephone lines operating characteristics may vary during the course of the day depending on local power usage or other factors. Such interference can result from a variety of sources. One of the most common arises from adjacent power line interference. Generally, telephone lines share the same poles or conduits with power lines when passing through or over public utility rights of way. Thus, the lines are exposed to the transient magnetic and electric fields generated by adjacent power lines, power line transformers, capacitor banks and the like. Additionally, as power usage varies during the day the severity or even the existence of the problem for modem-to-modem communication will vary. For instance, in the early afternoon when the power grid may be handling very heavily loads, in particular for industrial applications, the interference can be significant. Where as during periods of low load, such as early morning or late evening, the problem may be nonexistent.

When a technician goes to the location of the remotely located security unit to determine the problem, assuming it involves a communication problem, one of the tests that he or she will need to do is to test the quality of the telephone line. Typically, testing the quality of the local telephone line involves connecting a telephone line tester to the remotely located security unit's telephone line and calling a quiet line and a tone line. With the quiet line and tone lines as a base, various parameters of the quality of the subject telephone line being tested can be determined including the noise on the line. This is the standard way a telephone company tests the quality of their lines. Telephone companies typically have quiet and tone lines set aside for use by their own service personnel. However, they usually are reluctant to let outside parties use these lines.

Communications problems can be among the most debilitating problems in maintaining a remotely controlled security system. In more sophisticated security systems, most problems with remotely located security units can be identified by communicating with the computer and monitoring the operation of the remote security system. Remotely located systems often have fairly sophisticated computer systems that include diagnostic units for detecting and identifying hardware and software problems and failures. In fact some of the problems can be corrected over the communication link without the need of sending a trained technician to the unit. However, if the communication link is poor or subject to frequent interruption, diagnosing the problems becomes all the more difficult.

Thus, what is needed is a system and method for identifying and resolving communications problems with a remote security system. Such a system should include a system and method that will identify and resolve communication problems on a local telephone line used to communicate with the local unit without having to send a trained technician to the site of the remote security system. Additionally, such a system and method should be implementable without the assistance of the local telephone company.

SUMMARY

It is an objective of the present invention to provide a system and method for diagnosing and identifying problems with a local telephone line used to communicate with a remote security unit. It is a further object to provide a system and method that can be implemented and used to test the local lines over the public telephone system from another location without the need for a technician to go the local unit. It is a further objective to provide a system that is economical to manufacture that can be easily integrated into an existing security system and can function without the need for assistance from the local telephone company.

To accomplish these and other objectives, the invention provides a system for troubleshooting a security system telephone line from a remote location, having: a security system; a communication system forming part of said security system; a telephone line operatively connected to said security system; a telephone test line apparatus forming part of said communication system of said security system; and a remotely located telephone line testing component that can call said communication system and with the aid of said test line apparatus test the quality of said telephone line connected to said security systems communication unit and determine the operating characteristics of said telephone line operatively connected to said security system communication unit. In a further aspect the said telephone test line apparatus includes a quiet line emulator and a tone line emulator.

BRIEF DESCRIPTION OF THE DRAWINGS

The invention will be better understood by an examination of the following description, together with the accompanying drawings, in which.

DETAILED DESCRIPTION OF THE PREFERRED EMBODIMENT

The present invention tests the quality of the local telephone line being used by a remote security unit by including in the local security unit a quiet line and a tone line emulator, to be discussed below. Thus, when the vendor's unit or some other central control unit calls the remote unit experiencing communications problems, the vendor's unit or the central control unit would initiate a series of tests to be conducted to determine the problem. One of the first tests to be initiated would be to analyze the quality of the local telephone line. The vendor's unit or the central control unit would do so by means of a telephone line tester that would be connected to the line. Upon enablement of the quiet line and then the tone line emulators a series of test will be conducted by the telephone line tester to determine the quality of the local telephone line. The following description will first discuss the overall functional components of the system and then the method of the invention.

Figure 1:
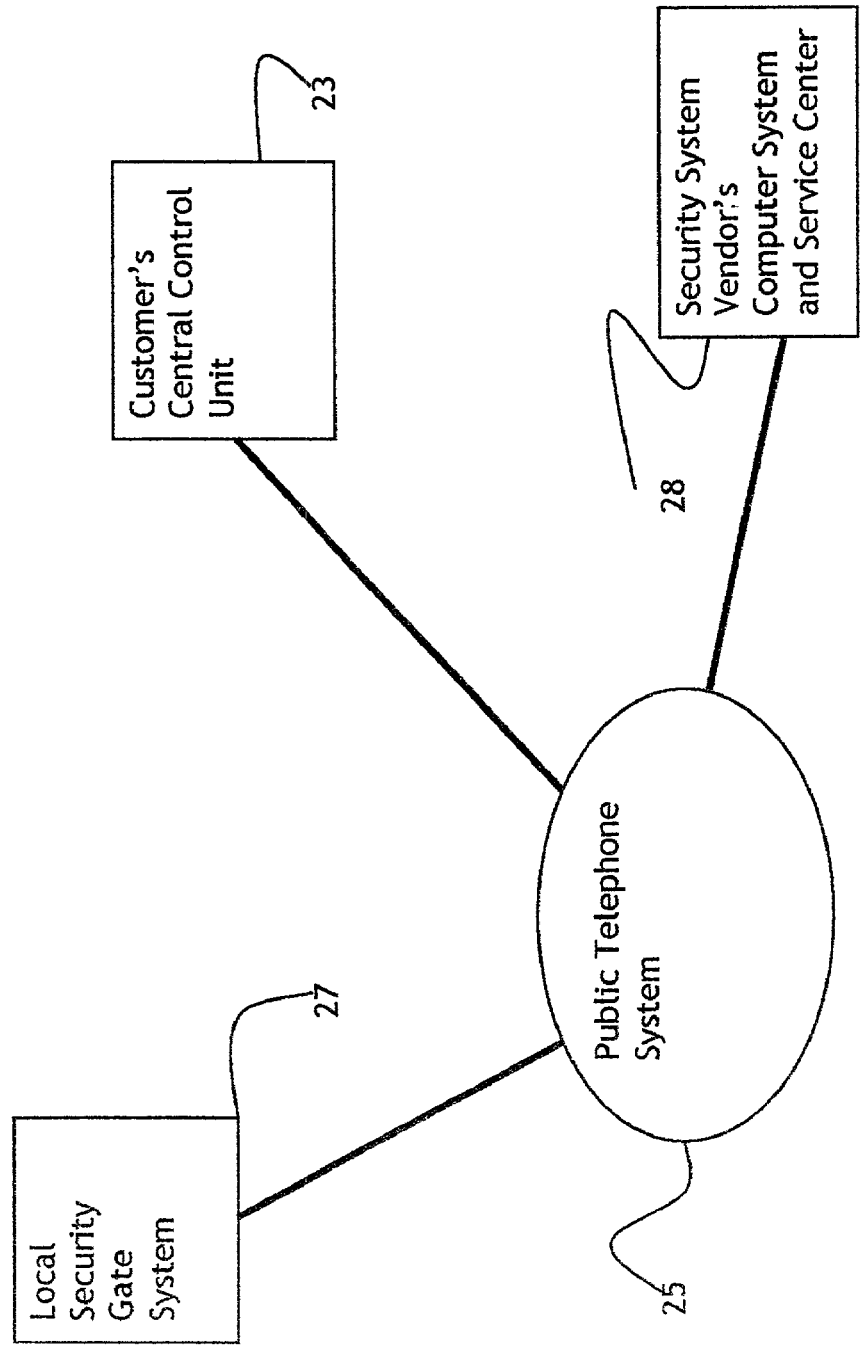
FIG. 1 is a simple block diagram of the type of system in which a preferred embodiment of the present invention would function.

FIG. 1 provides a block type of diagram of the overall type of system that the current invention will be used with. The customer's central control computer or unit 23 connects via the public telephone system 25 to one or more remote security units 27 of the customer's security system. Use of the pubic phone system avoids the need of constructing a private dedicated communication network to communicate with the remotely located security units. Additionally, connection of the entire system to the public telephone network allows the vendor's computer 28 to obtain access to the various components of the customer's system for service and trouble shooting.

Figure 2:
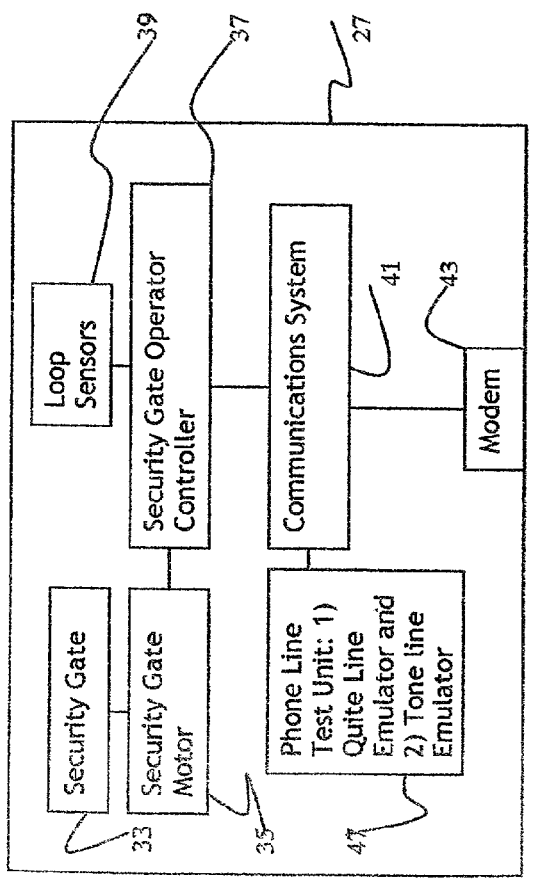
FIG. 2 is a block diagram of a local security unit into which the present invention has been incorporated.

The local security unit 27 will typically consist of a security gate 33 (FIG. 2), a security gate motor 35 for movement of security gate 33. Security gate operator controller 37 to, among other things control operation of motor 35. When the system is functioning, security gate operator 37 receives signals from loop sensors 39 embedded in the roadway adjacent to gate 33 indicating the presence of a vehicle. Local system 27 also includes a communication unit 41, which provides communication for a variety of purposes. Among them might be transmission of a request for identification for a vehicle adjacent to the gate that has been detected by loop sensor 39. In standard fashion, a transponder in the vehicle detected would then respond with a coded signal, which upon receipt of the signal by communication unit 41 and identification by gate operator opens gate 33 to allow the vehicle into the restricted access area. Communication system 41 would also connect to the regular telephone lines by modem to allow for communication with various central control units as depicted in FIG. 1. The system also includes a phone line test unit 47. Phone line test unit 47 includes a quiet line emulator and a tone line emulator.

The quiet line and tone line emulator 47 on the remote security system would consist of a terminating device to emulate a quite line and a tone generator to emulate a tone line, the activation of each controlled by software within the communication system 41. In order to emulate a quite line, the telephone line is A.C. terminated across the TIP and RING in a balanced manner to reflect a 600 ohm impedance to that telephone line. This is accomplished by connecting the primary of a 600 ohm telephone coupling transformer between the TIP and RING and shorting the secondary windings. The tone line is the same as the quite line except a tone is injected across the secondary windings. This tone is ideally set to 1004 hertz but any constant single tone or multi-tone signal is acceptable. The amplitude of the tone as measured at the connection of the security unit is 0 dB (zero decibels) indicating zero loss.

Figure 3:
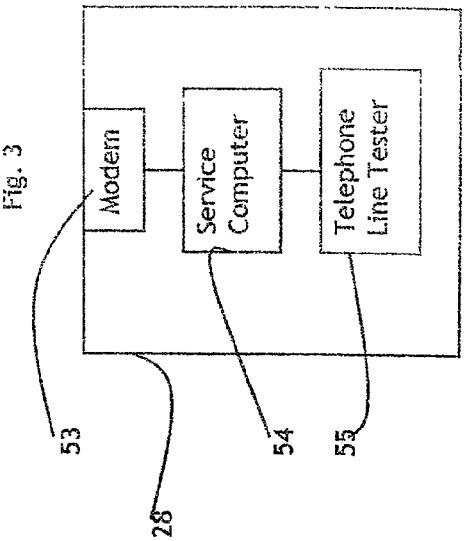
FIG. 3 is block diagram of a central control unit into which the present invention has been incorporated.

FIG. 3 is a block type of diagram depicting the functional components of the vendor's unit 28 that will be conducting the tests of the remote unit's local telephone line. The necessary components to conduct the test are a properly programmed Service Computer 51 with modem 53 to connect to the public telephone system and a telephone line tester 55 also connected to the public telephone system. It should be noted that the central control unit of the security system could also have the necessary test functional features described above to conduct the tests.

Telephone line testers are well known in the industry. There are a variety of different sources for these devices including made a Wilcom line tester model T136BGMZW made by Wilcom Products of Laconia, N.H. Telephone line testers use a quiet line and a tone line to test the quality of the line being tested. In a standard test a call is made on the line being tested to a quiet line and tone line located at the central office of a local telephone company. The parameters typically tested by a telephone line tester are: 1) loop current, 2) tip to ring voltage, 3) ring to ground current, 4) circuit loss [determines loss of the signal], 5) circuit noise, 6) power influence [tested over time], and 7) impedance between tip and ring. Among the more important parameters tested for this invention are: 1) Circuit noise, which would indicate a problem of circuit induced noise; 2), Power influence, which would indicate a problem of interference from external sources such as the local power lines; and 3) Circuit loss, which would indicate excessive resistance and capacitance sometimes caused by the line being to far away from the central telephone office. For example if the circuit loss is really bad, by the time the signal arrives at its destination it is so attenuated that the modem-to-modem connection is in jeopardy. When the connection between the modems degrades, the modems step down their speeds and will eventually cease to communicate.

The present invention as noted above has a quiet and tone line emulator built into either the software or hardware or both of the remote security unit. Since the actual telephone line tester will be at another computer, perhaps several hundred miles away, there may be some question of interference on the lines somewhere between the remote units local line and the testing unit. However, in most instances the test results of the local telephone line will be fairly accurate even if the actual test unit is several hundred miles away, assuming the connection between the test unit and the local central telephone office is good. This is due to the fact that in transmitting a signal over the telephone system the signal will be passing through a series of intermediate switching offices of the telephone system and at each switching office the incoming signal is analyzed and processed to maintain an industry wide signal standard before passing it on to the next switching office.

Figure 4:
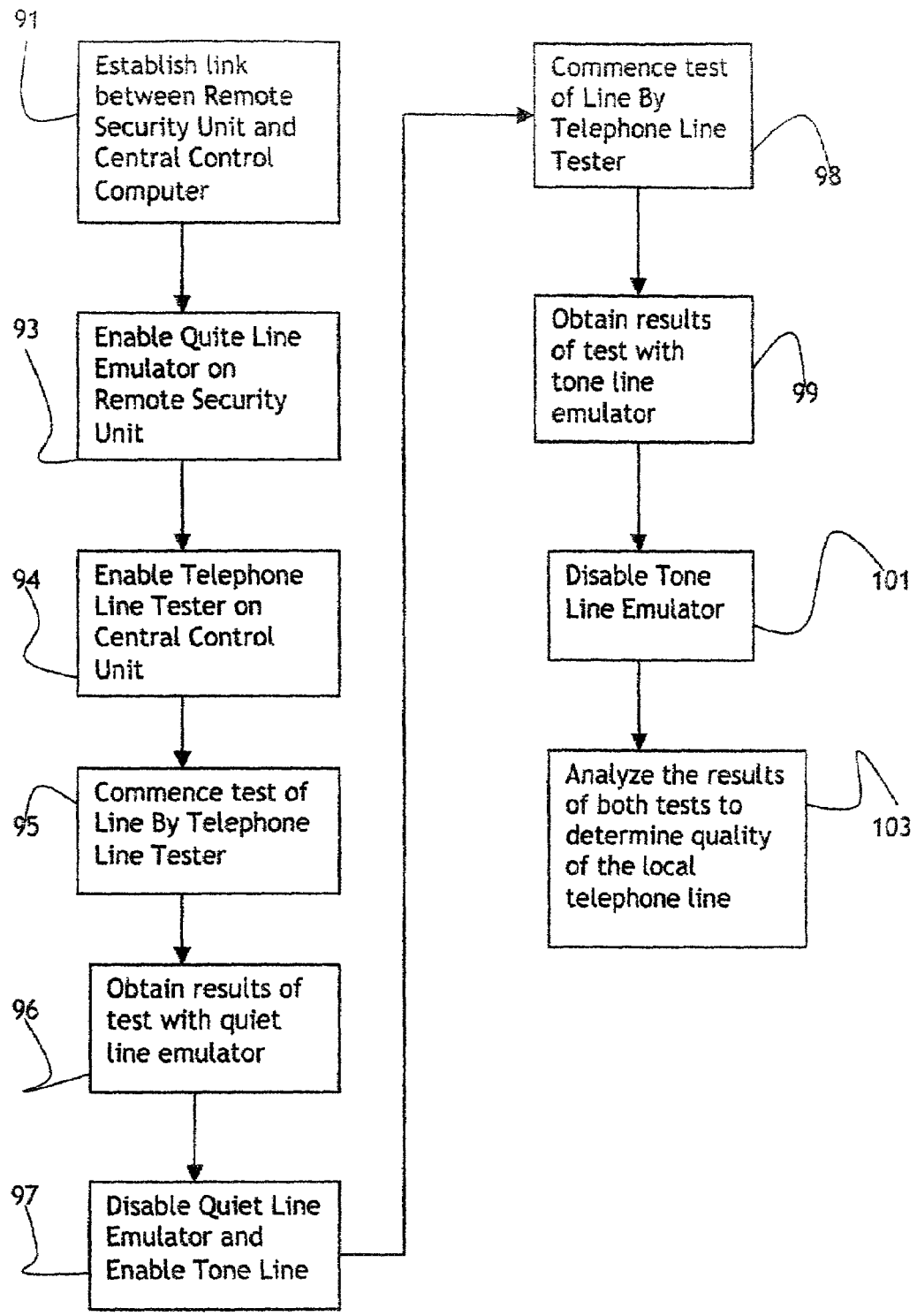
FIG. 4 is a flow chart of the steps of one version of the method of the present invention.

The method of the invention consists of first establishing a link between the Remote Security Unit with the telephone line to be tested and the Vendor or Central Service Computer 91 (FIG. 4). Then enabling the quiet line emulator 93 after which the telephone line tester is enabled 94 and the test conducted 95. Upon completion of the tests with the quiet line and the obtaining of the results 96, the quiet line emulator is shut off 97. The next step is the enablement of the tone line emulator 97 after which testing of the telephone line by the telephone line tester is commenced 98 and the results of the test of the tone line 99 are obtained. The tone line is then shut off 101 and the results analyzed 103.

While the invention has been particularly shown and described with reference to a preferred embodiment thereof, it will be understood by those skilled in the art that various changes in form and detail may be made to it without departing from the spirit and scope of the invention.

I claim:

1. A system for troubleshooting a security system telephone line from a remote location, comprising:
   a security system;
   a communication system forming part of said security system;
   a telephone line operatively connecting the communication system of said security system with a public telephone system;
   a telephone test line apparatus forming part of said communication system of said security system said telephone test line apparatus for emulating a plurality of telephone line conditions on the telephone line; and
   a telephone line tester remote from the security system and connected to the public telephone system which upon prompting, calls said communication system of the security system via the public telephone system and in coordination with the test line apparatus of the security system tests the quality of said telephone line connected to the communication system and which determines the operating characteristics of said telephone line operatively connected to the communication unit of the security system.

2. The system of claim 1 wherein the said telephone test line apparatus of the security system comprises a quiet line emulator and a tone line emulator.

3. The system of claim 1 wherein the said telephone test line apparatus of the security system comprises a quiet line emulator.

4. The system of claim 1 wherein the said telephone test line apparatus of the security system comprises a tone line emulator.

5. The system of claim 1 wherein the telephone line quality characteristics tested are a) loop current, b) tip to ring voltage, c) ring to ground current, d) circuit loss, e) circuit noise, and f) power influence.

6. A method for troubleshooting a security system connected by a telephone line of a public telephone system to a remotely located central unit, comprising the steps of:
   contacting the remotely located security system by the central unit over the public telephone system;
   activating a phone line test apparatus which forms part of the security system and which emulates a plurality of line conditions on the telephone line;
   coordinating operations of the phone line test apparatus of the remotely located security system with a telephone line tester located at the central unit and testing a plurality of quality characteristics of the telephone line connected between the security system and the central unit; and
   determining operating characteristics of the telephone line connected to the remote security system.

7. The method of claim 6 wherein the quality characteristics tested are: a) loop current, b) tip to ring voltage, c) ring to ground current, d) circuit loss, e) circuit noise, and f) power influence.

8. The method of testing the quality of a public switched telephone line connected between a central unit and a remote security system comprising:
   establishing a telephone line connection between the remote security system and the central unit;
   emulating by the remote security system a first condition on the telephone line;
   first testing at the central control unit the quality of line characteristics on the telephone line in response to the first emulated line condition;
   at the security system, disabling the first emulated condition and emulating a second condition on the telephone line;
   second testing at the central unit, the quality of line characteristics on the telephone line in response to the second emulated line condition; and
   analyzing results from both the first testing and the second testing steps to determine the quality of the telephone line connection.

9. A method according to claim 8 wherein the first condition comprises emulating a quiet line.

10. A method according to claim 9 wherein the second condition comprises emulating a tone.

11. A method according to claim 8 wherein the first condition comprises emulating a tone.

12. A method according to claim 11 wherein the second condition comprises emulating a quiet line.

* * * * *